United States Patent [19]

Boardman et al.

[11] Patent Number: 5,023,463
[45] Date of Patent: Jun. 11, 1991

[54] PHOTONIC ARRAY BUS FOR DATA PROCESSING AND COMMUNICATION SYSTEMS

[75] Inventors: John D. Boardman; Jimmie L. Sadler, both of Garland; Richard A. Trimble, Rowlett, all of Tex.

[73] Assignee: E-Systems, Inc., Dallas, Tex.

[21] Appl. No.: 493,952

[22] Filed: Mar. 15, 1990

[51] Int. Cl.$^5$ .......................................... G02B 27/00
[52] U.S. Cl. .................................... 250/551; 455/607
[58] Field of Search ................ 250/551; 455/601, 607, 455/617

[56] References Cited

U.S. PATENT DOCUMENTS 4,584,678  4/1986  Ozeki et al. ........................ 455/607
4,834,483  5/1989  Arthurs et al. ..................... 455/617

FOREIGN PATENT DOCUMENTS 58-42333  3/1983  Japan .................................. 455/612

Primary Examiner—Davis L. Willis
Assistant Examiner—K. Shami
Attorney, Agent, or Firm—Harold E. Meier

[57] ABSTRACT

A photonic array bus provides a connectorless, computer backplane-like communication systems for advanced data processing and communications systems requiring operation rates exceeding 1 gigahertz. Components of a multiple component advanced data processing or communications system are coupled to pairs of laser transmitters and laser receivers. The laser transmitter and receiver pairs are arrayed in a coplanar circular fashion about a central disperser lens. A laser transmitter emits a laser beam incident on the central disperser lens. The central disperser lens disperses the laser beam into a coplanar array of laser beams illuminating the laser receivers. Multiple channel operation is achieved by "stacking" along the length of the disperser lens coplanar arrays of pairs of laser transmitters and receivers.

19 Claims, 5 Drawing Sheets

PHOTONIC ARRAY BUS FOR DATA PROCESSING AND COMMUNICATION SYSTEMS

TECHNICAL FIELD

The invention relates to ultra-high speed data processing and communication systems, and more particularly to data processing and communication systems utilizing optical communications media.

BACKGROUND OF THE INVENTION

Advanced data processing and communication systems are comprised of numerous components or subsystems. Types of advanced data processing systems typically include a super computer utilizing an array of processors, a super-memory utilizing an array of data storage devices, a neural network or a combination of devices, any one of which operates at very high data or processing rates. Advanced communication systems typically include communication hubs for local area networks and other types of networks. The emphasis in the design and development of these advanced systems has primarily been on increasing the operating rates of discrete system components and interconnecting larger numbers of components to achieve greater processing or networking capabilities. With increases in the operating rates of the discrete system components and the number of interconnections comes an increasing demand on the system's signal distribution network for ultra-high speed transfers of large amounts of data between the components of the system.

Current signal distribution systems in advanced processing systems rely on backplanes and other types of communication busses using wires and cables that require very large numbers of connections between components. Because of the number of connections required, and because of the limited bandwidth or data rates of conventional cabling, optimal system architectures are rarely achieved. Consequently, data transfers between components are accomplished at data or signalling rates magnitudes slower than the operating rates of at least the faster system components, and access times for the system are significantly longer. In sum, the overall performance of an advanced processing system is limited by the conventional signal distribution systems.

To achieve optimal system architectures or configurations of the components in an advanced data processing system, several problems must be overcome. For example, there are physical limitations in the number of input/output (I/O) pins available for interconnecting the components, not only limiting the number of components that can be interconnected, but also limiting the available bandwidth. The number of signal interconnections is also limited by loading effects where the signal is "fanned-out" from the transmitter of one component to the receiver of several components. The transmitter has limited output power.

Increasing the bandwidth by increasing the data or signalling rates exacerbates several other problems. Voltage standing waves on cabling cause multipath "echoes", especially in a "fan-in" distribution system where a receiver is coupled to more than one transmitter. Cross-talk induced by magnetic coupling of proximate cabling increases with the signalling bandwidth. Thus, the task of data detection at the receivers become much more difficult, especially when interference is taken into account, as data rates increase. Voltage standing waves in the signal distribution system causes signal reflection problems, slow access times to logic devices, and limited bandwidth. Each of these problems are exacerbated by increasingly faster signalling and data rates. To compensate for some of these problems, additional data buffers, rate-smoothing interfaces, memories and processors are incorporated into the distribution system, thus increasing the processing system's design complexity and cost.

At higher data speeds, the physical layout of the components of the advanced data processing system become critical. The number of connections, for example, between the processing and control equipment, disk and tape units and external I/O devices, requires large amounts of cable. Beside the logistical problems of dealing with so much cabling, high speed data does not travel well on long cables due to narrow bandwidth, significant power loss and relatively slow travel speeds. In present advanced data processing systems, components that require fast access to "remote" data are positioned in close proximity to the data source. Furthermore, there are time skew problems where several components require access to the same data at the same time. One solution to these problems has been to resort to densely-packed, super-cooled modules that are "bricked" into a computing structure. However, "bricking" leaves very little space for architectural modifications and requires unacceptable downtime for repairs.

In the end, advanced processing and communication systems requiring large bandwidths and large numbers of interconnections force high-risk, high-cost and high-density solutions that are more difficult to design than the algorithms being processed, and are difficult to maintain in the field. What is required is an ultra-wideband signal distribution system for large-scale advanced data processing and communication systems.

SUMMARY OF THE INVENTION

Photonic array bus architecture provides a very wide bandwidth (over 1 gigahertz per channel) photonic signalling system for a very wide variety of advanced systems, such as array processors, wide-band multiport memories, high-performance supercomputers, peripherals and network communications hubs for communication systems. As such, a photonic array bus (PAB) functions as would a computer backplane. However, it has no mechanical connections.

A PAB communicates data with a laser beam across an optical atmosphere bus. The PAB, when viewed from overhead, appears to look like a wagon wheel. Circuit cards form "spokes" in the wheel when they are inserted into a circular card cage or carousel. A disperser lens forms the hub of the wheel. One edge of each circuit card is equipped with a laser diode for transmitting a signal via a modulated and collimated laser beam and a detector for receiving a laser beam. The disperser lens splits an incident transmitted laser beam such that equal proportions of the incident laser beam reach all the detectors on the PAB substantially simultaneously. As in any bus operation, only one of the transmitters may signal at a time.

Each card or module of the PAB has several optical channels analogous to a conventional computer bus which may have four, eight, sixteen, thirty-two or a higher number of bits or channels. The transmitting laser diodes and detectors for an optical channel are arranged in a plane perpendicular to the disperser lens. The dispenser lens disperses an incident collimated laser beam of an optical channel into an omnidirectional plane of light that illuminates the coplanar photodetectors of that optical channel. There is substantially no interference or cross-talk with adjacent channels The photonic array bus minimizes the problems associated with the standard computer backplanes, and presents the possibility of achieving optimal system architectures. Excess loading effects at high speeds and voltage standing waves are no longer problems. A photonic array bus has an ultra-wide bandwidth. The unique circular configuration of a multi-channel PAB provides the potential of ultra high frequency operation of an advanced system due to the minimal time skew between any transmitting laser diode and the multiple receivers on the other circuit cards.

The use of photonic signalling and the circular configuration also provides a means for interconnecting the large number of signals required in an advanced data processing or communications system, with even greater numbers possible through expansion of the number of cards and channels. Close proximity of a large number of components is achieved without resort to "bricking." Furthermore, the open top and bottom of the carousel make it easily adaptable to methods of cooling very densely packed circuit cards.

In maintenance and manufacture, the PAB has the significant advantage of permitting the removal and insertion of circuit cards into the carousel without minimum interruption or shut down of the entire system since there are no physical connections between the cards. The ability to insert and remove the cards also makes the system highly adaptable.

Other features include the advantage of communicating analog signals with a laser diode transmitter with minimal detection circuitry, and the provision for a "pipeline" bus communication system with data flow channels oriented orthogonally to the card surface for laser beams signaling between adjacent card surfaces.

DETAILED DESCRIPTION OF THE DRAWINGS

Figure 1A:
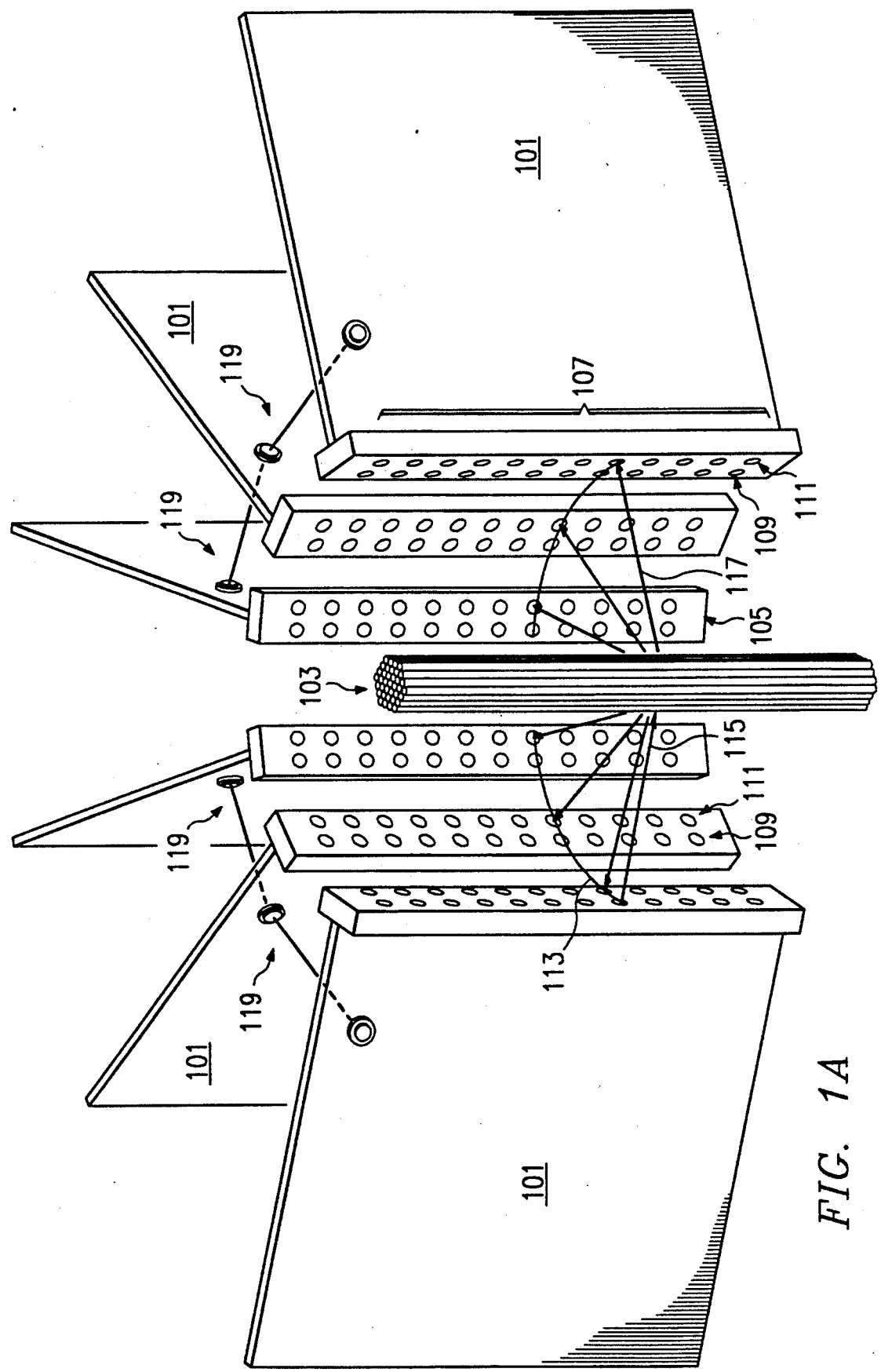
FIG. 1A is a perspective view of a photonic array bus.

Referring to FIG. 1A, a plurality of motherboards or circuit cards 101 are arrayed in a circular fashion, though not necessarily in a circle, about a disperser lens 103. Mounted on the circuit cards are circuits, functioning as components of advanced data processing or communication systems such as super memories, supercomputers, neural networks, arrayed processors, or communication hubs. On a front edge of each of the circuit cards 101 is mounted an electro-optical module 105 for interfacing the circuit cards with a photonic array bus. Each electro-optical module 105 may also be arrayed around the disperser lens 103 without being mounted to the circuit card. The modules would, in this case, be electrically or optically coupled to the circuit cards or to members of a communications network.

Each electro-optical module 105 has twelve levels of vertically stacked pairs 107 of collimating lens 109 and horizontally adjacent collecting lens 111. Now referring to FIG. 1B, a laser diode 110 for each laser transmitter is located within the electro-optical module 105. The collimating lens 109 focuses the coherent light emitted from the laser diode 110 into a collimated laser beam 115 incident on disperser lens 103. Together, the laser diode and the collimating lens comprise a laser transmitter. A photodetecting diode 112 also is located within the electro-optical module 105. The collecting lens focuses on the diode a portion of resultant coplanar laser beams 117 from the disperser lens 103 that are incident on the collecting lens. The photodetecting diode and the collecting lens comprise a laser receiver.

Figure 1B:
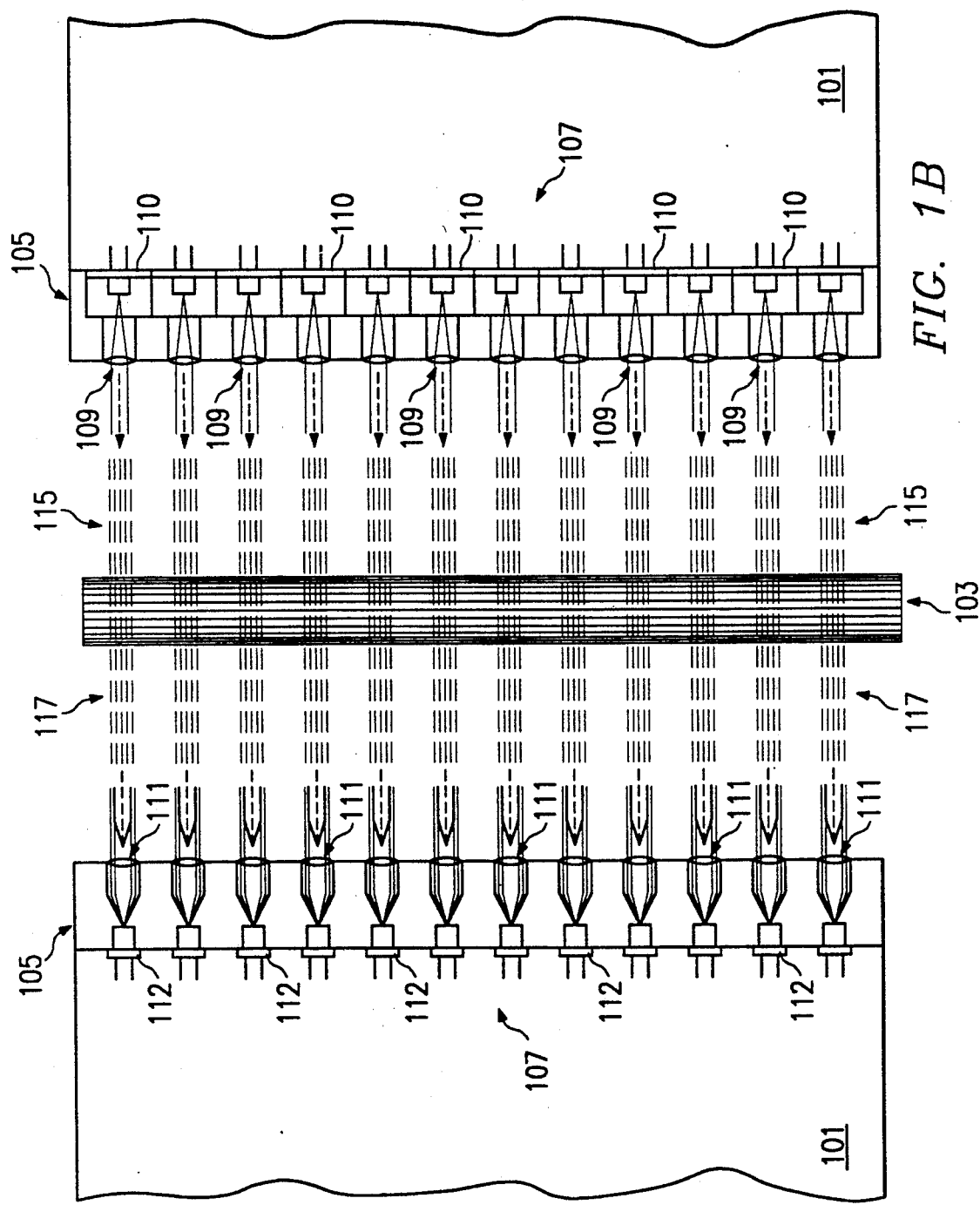
FIG. 1B is a cross-sectional, side view of a photonic array bus.

Referring now to FIGS. 1A and 1B together, coplanar pairs of laser transmitters and laser receivers form optical channels. Line 113 of FIG. 1A indicates those coplanar pairs forming a single optical channel. The twelve levels of vertically stacked pairs 107 of laser transmitters and laser receivers thus enable twelve channel operation between all the electro-optical modules 105 when corresponding levels in each module are coplanar.

Communication in an optical channel takes place when one laser transmitter transmits a collimated laser beam 115, modulated by an information bearing signal, toward the disperser lens 103. The disperser lens 103 splits or disperses the incident laser beam 115 into a plurality of resultant coplanar laser beams 117 that form a plane of light coplanar with laser beam 115, that illuminate coplanar collecting lens 111, and that, consequently, illuminate the photodetectors of the laser receivers sharing the optical channel. Although twelve channels are shown, any number of independently functioning channels can be placed or "stacked" along the length of the disperser lens 103. Furthermore, each optical channel may be multiplexed by using several different frequency laser diodes 110 and corresponding filters between the collecting lens 111 and the photo detectors 112.

Referring back to FIG. IA only, a separate data flow channel 119 between adjacent circuit cards 101 for "pipeline" bus communication enables operation of circuit cards or groups of circuit cards independently of the operation of the photonic array bus. A laser transmitter, comprised of a laser diode and collimating lens mounted on a surface of a circuit card 101, transmits orthogonally to a surface of the circuit card on which it is mounted a collimated laser beam modulated by an information bearing signal. A photodetector mounted on an opposite surface of an adjacent circuit card acts as a laser receiver and detects the information bearing signal. No collector lens is needed for the photodetector.

Figure 2:
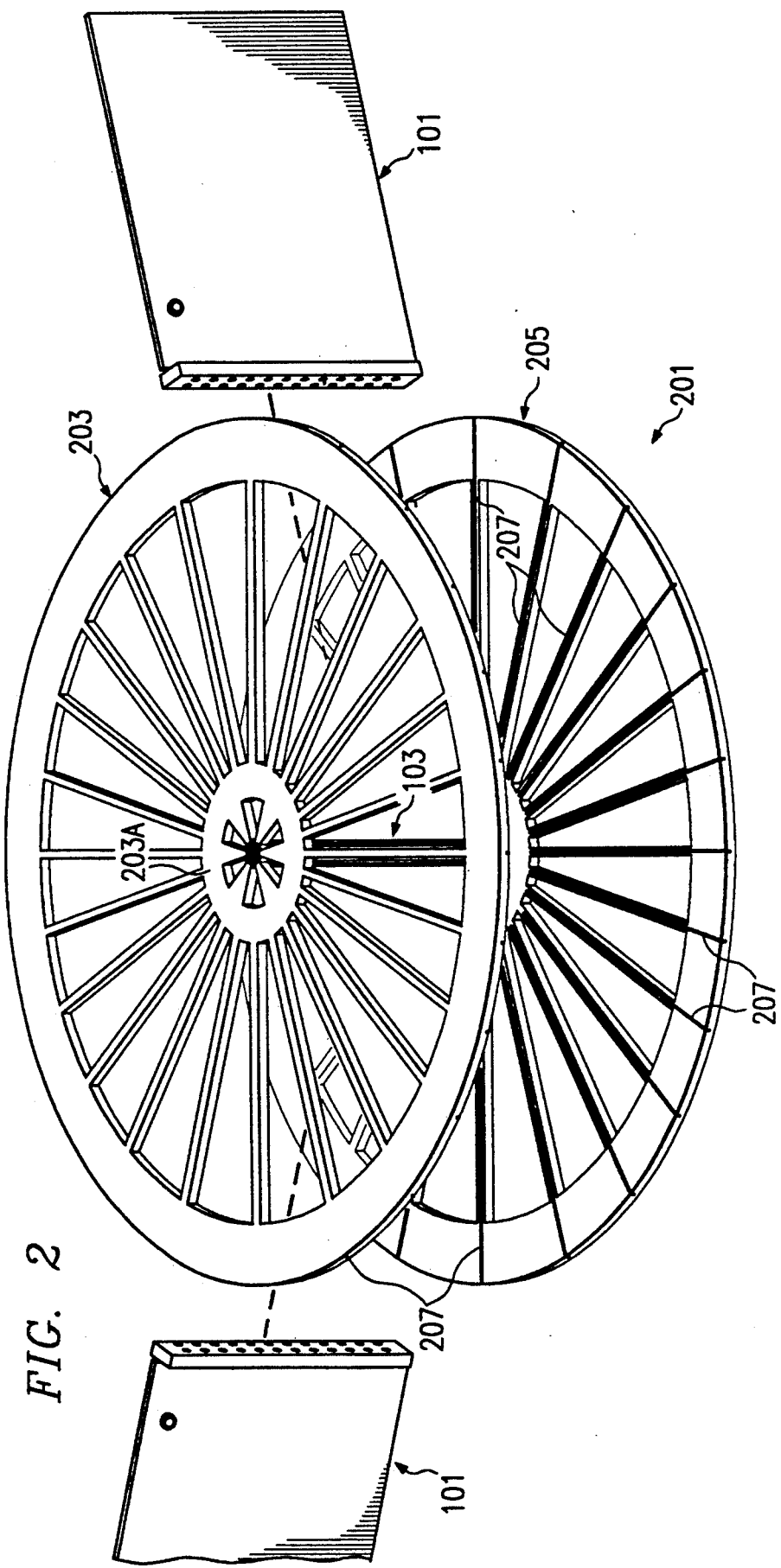
FIG. 2 is a perspective view of a carousel card cage for a photonic array bus.

Referring now to FIG. 2, a carousel card cage 201 is designed to hold on edge a circular array of circuit cards 101, mounted with electro-optical modules 105, in a circular fashion about the disperser lens 103. The carousel card cage 201 is comprised of circular top and bottom sections 203 and 205, interconnected by vertical support braces that are not shown. The disperser lens 103 is held in the center of the carousel by guides of the circular top section 203 (guide 203A) and the circular bottom section 205. A plurality of circuit card slots 207 are formed in the top section 203 and the bottom section 205, into which circuit cards are inserted and arranged in a circular fashion. Supporting the circuit cards on edge preserves space and enables more circuit cards to have access to the photonic array bus. The carousel card cage 201 is constructed of a hard metal alloy, such as aluminum-magnesium, which is rigid enough to maintain optical alignment as thermal and flexing forces occur.

Figure 3:
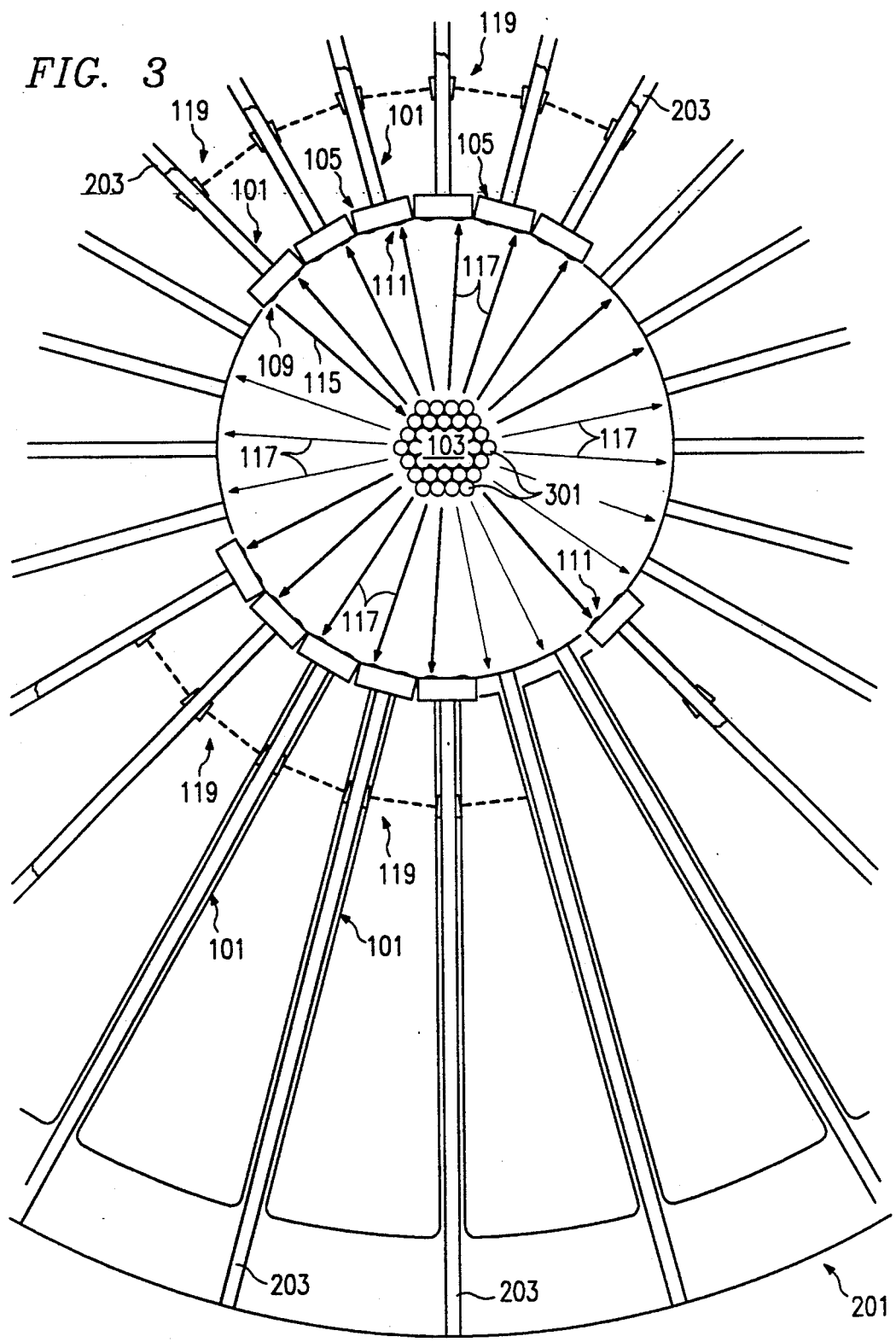
FIG. 3 is a cross sectional, top view of a photonic array bus carousel with inserted circuit cards.

Referring now to FIG. 3, a plurality of circuit cards 101, each with electro-optical module 105 attached to a front edge thereof, are shown as being inserted into slots 207 of the 24-slot carousel card cage 201. Circuit cards are insertable and removable while the photonic array bus is functioning without interrupting the use of the photonic array bus by the remaining circuit cards. Not every card slot must be occupied for the photonic array bus to operate, nor does a particular card need to be in any particular slot. This "position independent" property of the circular array of electro-optical modules 105 is illustrated by the carousel card cage not being fully complemented with circuit cards and electro-optical modules. However, a system which also uses a data flow channel 119 must maintain the correct adjacency of groups of cards, but the group could reside at any location in the carousel card cage. An operating system needs only to know the logical address of the card.

The central disperser lens 103 is a means for dispersing or splitting an incident collimated laser beam 115 from a laser transmitter into an omnidirection radial plane of resultant laser beams 117 that illuminate the collimating lens 111 of the laser receivers associated with that optical channel. In order to reduce the spacing between the optical channels along disperser lens 103, and thereby increase the number that can be stacked along the disperser lens 103, the incident laser beam 115 has an angle of incidence to the surface of the central disperser lens 103 close to zero degrees. A small angle of incidence minimizes refractions in a direction parallel to the surface of the disperser lens. Each optical channel thereby operates independently without interference or cross-talk with closely spaced adjacent optical channels. In another embodiment, the number of circuit cards arrayed about the disperser lens 103 may be increased, at the expense of increased spacing between channels, by switching the horizontal orientation, shown in FIG. 1A, of the laser receiver and laser transmitter pairs to a vertical orientation. In this case, the angle of incidence of the incident laser beam 115 must be changed so that resultant laser beams 117 form a cone of omnidirectional light and illuminate the photodetectors of the corresponding optical channel.

For digital communication, the proportion of the incident laser beam 115 that, after dispersion, illuminates each photodetector must be intense enough to trigger the threshold detector in each receiver. The disperser lens 103 therefore must effiCiently transmit power of the laser beam in order to maximize the signal to noise ratio. The disperser lens must also disperse the incident laser beam 115 into an onmidirectional pattern of light having a sufficiently uniform intensity so that all the photodetectors on the optical channel receive sufficient illumination, and so that the number of laser receivers that may occupy the photonic array bus is maximized. The collecting lens 111 of the laser receivers are positioned and focused to provide the photodetectors with a sufficient amount of energy to detect the information bearing signal modulating the resultant laser beams 117.

The preferred embodiment of the central disperser lens 103 is a sheaf of thirty-seven clear capillary tubes, e.g., capillary pipettes 301, closely packed and arrayed in a hexagonal shape. More pipettes can be used, but increasing the number of pipettes increases the diameter of the disperser lens 103, which increase causes decreased bandwidth. Fewer pipettes can be used, but at the expense of a less uniform distribution of resultant laser beams 117. For a bandwidth of 1.8 gigahertz, the capillary pipettes have a diameter of two millimeters. Larger bandwidths may be achieved by reducing the diameter of the disperser lens 103 by, in turn, reducing the diameter of the pipettes 301. The diameter of the incident laser beam 115 may also be reduced, but to provide a uniform distribution the incident laser beam should be large enough so as to be incident on at least two to three pipettes. To reduce losses due to fluorescence common in silica and Pyrex glass, the capillary pipettes are made from BK-7 glass. With an incident laser beam 115 having a diameter of approximately five millimeters, the sheaf of capillary pipettes provides a omnidirectional planar distribution of laser resultant laser beams 117. The omnidirectional, planar distribution of resultant laser beams 117 has a sufficiently uniform power distribution to illuminate the collector lens 111 of a circular photonic array bus for communication approaching a bandwidth of 1.8 gigahertz.

An array of capillary tubes provide a large number of reflective and refracting surfaces so that an incident laser beam is "fanned" into a relatively uniform omnidirectional distribution of planar resultant laser beams 117. Furthermore, the hexagonal shape allows for the closest packing, and there is no need to resort to more sophisticated methods of holding the pipettes together as would be required in other shaped arrays. However, non-hexagonal shapes may be used as a means for dispersing. Similarly, optical fibers, having an inner tube of glass with an exterior glass coating, also provides an equivalent means for dispersing. Greater attenuation due to dispersion and absorption results when materials other than air fill the pipettes.

If the planar array of resultant laser beams does not need to be omnidirectional, or if the power distribution need not be completely uniform, other means for dispersing the incident laser beam 115 into the desired pattern for illumination of the photodetectors of the laser receivers may be used. For example, a reflective or mirrored surface instead of a lens, may be used with a semicircular or a quarter-circle array of pairs of laser transmitters and laser receivers to provide illumination of photodetectors of the laser receivers. Various types of clear lens may also be used, but at the expense of increased cost, complexity, inefficiency and uniformity of distribution.

By maintaining equal distances between the disperser lens 103 and the photodetectors of the laser receivers, time skew between circuits coupled to the photonic array bus is minimized or eliminated. Use of the disperser lens also produces negligible loading effects on the circuit cards 101 on the photonic array bus, and allows the circuit cards 101 on the photonic array bus to be removed and inserted without disabling the bus or interfering with the use of the bus by the remaining circuit cards.

Figure 4:
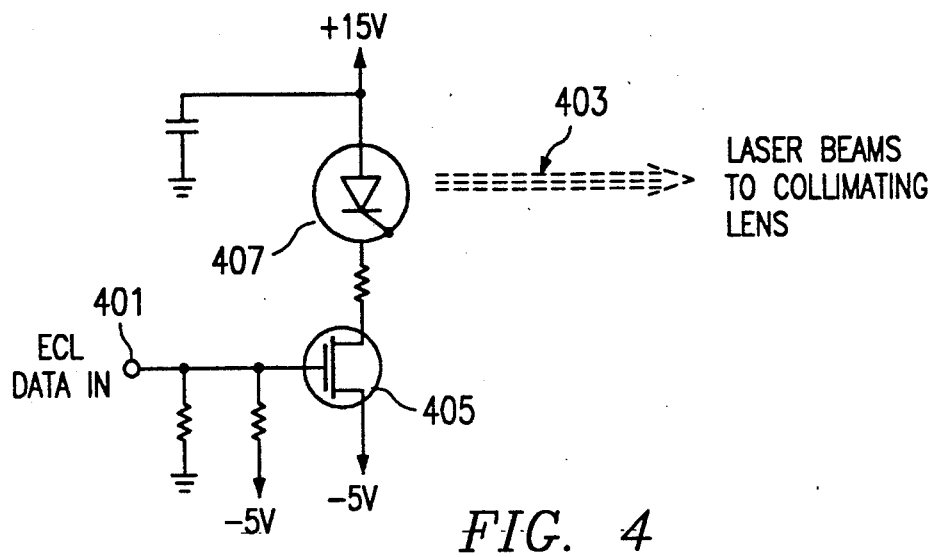
FIG. 4 is an electrical schematic of a laser transmitter suitable for use in a photonic array bus.

Referring now to FIG. 4, in the preferred embodiment, a digital laser transmitter comprises a laser diode modulator which converts an ECL-level logic signal on data input 401, the data signal being provided by an information source not shown, to an amplitude modulated laser beam 403 that is collimated by the collimating lens 109 shown in FIG. 1. The ECL-level logic signal is coupled to a field effect transistor (FET) current gate 405. Laser diode 407 is biased to a "just-lasing" point and held at that point by an ECL logic level "0" at the gate of the FET 405. An ECL logical "1" signal on input 401 causes the gate of the FET 405 to conduct full current through the laser diode 407. The laser diode is chosen based on the application demand for modulation bandwith and output power.

The photonic array bus is equally capable of communicating analog information, or both digital and analog information. In this case, a laser diode is current modulated with an input signal bearing analog information from the information source.

Figure 5:
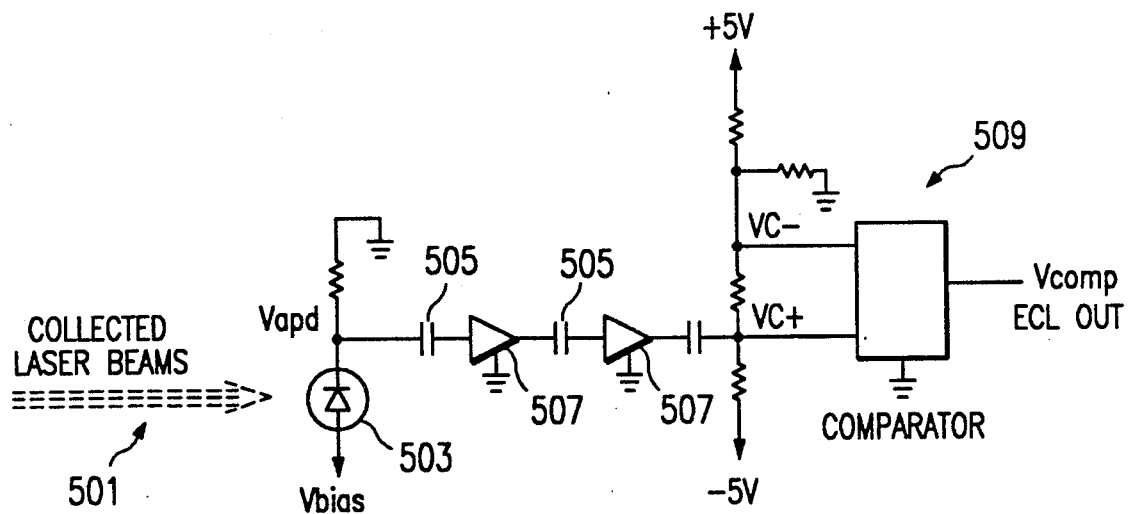
FIG. 5 is an electrical schematic of a laser receiver suitable for use with a photonic array bus.

Referring now to FIG. 5, the collector lens 111, shown in FIG. 1 focuses a laser beam 501 onto a photodetector, preferably an avalanche photo diode (APD) 503. The APD 503 is biased at an optimal point for sensitivity and signal to noise reception. The APD 503 is AC-coupled with capacitors 505 to RF amplifiers 507. The output of the RF amplifiers 507 is coupled to a logic threshold comparator circuit 509, the output of which represents the information signal transmitted on the photonic array bus. If analog information is being received, the threshold comparator circuit is bypassed.

While the invention has been described in connection with a preferred embodiment, it is not intended to limit the scope of the particular form set forth, but, on the contrary, is intended to cover such alternatives, modifications and equivalents as may be included within the spirit and scope of the invention as defined in the appended claims.

We claim:

1. A photonic array bus for data transfers between components of a data processing or communications system, comprising:
   a first coplanar array of pairs of laser transmitters and laser receivers coupled to the data processing or communications system; and
   means for dispersing a laser beam emitted by a laser transmitter in the first coplanar array into an axially extending plane of laser light incident on the laser receivers in the first coplanar array.

2. The photonic array bus as described in claim 1 wherein each pair of laser transmitters and laser receivers in the first coplanar array are substantially equidistant from the means for dispersing.

3. The photonic array bus as described in claim 2 wherein the first coplanar array of laser transmitters and laser receivers is arranged in a substantially circular configuration about the means for dispersing.

4. The photonic array bus according to claim 1 further comprising a second coplanar array of laser transmitters and laser receivers positioned in a plane parallel to the plane of the first coplanar array of laser transmitters and laser receivers.

5. The photonic array bus according to claim 4 wherein the means for dispersing extends to include the planes of the first and second coplanar arrays of laser transmitters and laser receivers.

6. The photonic array bus according to claim 1 wherein the means for dispersing comprises a sheaf of clear capillary tubes arranged in a polygonal form and oriented perpendicular to the plane of the first coplanar array of laser transmitters and laser receivers.

7. The photonic array bus according to claim 1 further comprising a plurality of circuit cards individually coupled to one pair of a laser transmitter and a laser receiver and a card cage carousel for holding the circuit cards in a circular configuration about the means for dispersing.

8. The photonic array bus according to claim 7 wherein each circuit card includes means for mounting a laser transmitter and laser receiver pair on a side adjacent to the means for dispersing and the plurality of circuit cards comprises the first coplanar array of pairs of laser transmitters and laser receivers.

9. The photonic array bus according to claim 8 further comprising a second coplanar array of pairs of laser transmitters and laser receivers mounted to the plurality of circuit cards.

10. A data processing system for data transfers between components of the system, comprising:
    a plurality of data processing components;
    a coplanar array of pairs of laser transmitters and laser receivers coupled to the plurality of data processing components; and
    means for dispersing an incident laser beam from a laser transmitter into a predetermined planar pattern of dispersed laser light coplanar with the incident laser beam.

11. The data processing system according to claim 1 further comprising a plurality of parallel coplanar arrays of pairs of laser transmitters and laser receivers coupled to the plurality of data processing components.

12. The advanced data processing system according to claim 10 wherein the pairs of laser transmitters and photodetectors are substantially equidistant from the means for dispersing.

13. The advanced data processing system according to claim 10 wherein the means for dispersing is a hexagonal sheaf of clear capillary tubes.

14. The data processing system according to claim 10 further comprising:
    a plurality of circuit cards supporting the plurality to data processing components coupled to at least one laser transmitter and laser receiver pair; and
    a carousel card cage for mounting the plurality of circuit cards, the circuit cards extending radially outward from the means for dispersing.

15. A communications back plane for data processing and communications systems comprising:
    a carousel card cage for supporting circuit cards extending radially outward from a center of the carousel card cage, the circuit cards including a laser transmitter and a laser receiver;
    an omni directional disperser lens extending through the center of the circular card cage for dispersing an incident laser beam into a radial array of laser beams coplanar with the incident beam.

16. The communications backplane according to claim 15 wherein the carousel card cage includes circular top and bottom sections with slots for receiving opposite edges of circuit cards.

17. The communications backplane according to claim 6 wherein the disperser lens is a hexagonally shaped sheaf of clear capillary tubes.

18. A method of transferring data between components of a data processing or communications system, comprising the steps of:

modulating a laser beam with signal bearing information to be transferred from a first data information source in an array of information sources including a second data information source;

transmitting the modulated laser beam to a dispersing bus;

dispersing, by means of the dispersing bus, the transmitted modulated laser beam into a radial array of modulated laser light coplanar with the transmitted modulated laser beam;

receiving at a second data information source in the array a portion of the dispersed modulated laser light; and demodulating the dispersed modulated laser light received at the second data information source to detect the signal bearing information.

19. The data processing system according to claim 11 wherein the means for dispersing is oriented perpendicular to, and extends to include, the plurality of parallel coplanar arrays of laser transmitters and laser receivers.

* * * * *